United States Patent [19]
Kennedy

[11] 3,730,633
[45] May 1, 1973

[54] PHOTOMETRIC DETECTOR AND MEASURING SYSTEM

[75] Inventor: William S. Kennedy, San Jose, Calif.

[73] Assignee: Aerotherm Corporation, Mountain View, Calif.

[22] Filed: Dec. 31, 1970

[21] Appl. No.: 103,065

[52] U.S. Cl..............356/156, 250/222 R, 250/224, 356/167
[51] Int. Cl..............................................G01b 11/00
[58] Field of Search......356/156–160, 167, 201, 206; 250/221, 222 R, 223, 224, 219 S

[56] References Cited

UNITED STATES PATENTS

| | | |
|---|---|---|
| 3,141,057 | 7/1964 | Action.............................250/219 S |
| 3,407,303 | 10/1968 | Konrad et al....................250/222 R |
| 3,591,801 | 7/1971 | Watson............................356/206 X |
| 2,548,755 | 4/1951 | Vossberg et al.................250/233 R |
| 3,258,686 | 6/1966 | Selgin..................................356/156 |
| 3,423,592 | 1/1969 | Selgin..................................356/167 |

Primary Examiner—Ronald L. Wibert
Assistant Examiner—F. L. Evans
Attorney—Flehr, Hohbach, Test, Albritton & Herbert

[57] ABSTRACT

Photometric system in which a portion of a columnized beam of light is interrupted by objects in a predetermined region, while another portion of the beam passes uninterrupted to a receiving station. The two portions of the beam are separated at the receiving station, and their intensities are compared to determine the presence of objects and the extent to which they are present in the region.

1 Claim, 3 Drawing Figures

INVENTOR
WILLIAM S. KENNEDY
By Flehr, Hohbach, Test
Albritton & Herbert
ATTORNEYS

PHOTOMETRIC DETECTOR AND MEASURING SYSTEM

BACKGROUND OF THE INVENTION

This invention pertains generally to photometric systems and more particularly to a photometric system for detecting the presence of an object and the extent to which the object is present in a predetermined region.

In the processing of foods, containers are commonly transported on conveyor belts and filled, weighed and capped or sealed by machines. It is frequently desirable to check the contents of the container before it is capped or sealed to make sure that they do not extend above the top of the container. Otherwise, the capping or sealing operation could damage the contents. For example, potato chips made from reprocessed potatoes are packaged in stacks in cans. If a stack of potato chips extends above the top of its can when the lid is crimped in place, the potato chips will be broken by the crimping operation.

Heretofore, there have been some attempts to check the height of food products in their containers by means of a light source and photocell. In such systems, the light source and photocell are positioned such that the light is interrupted whenever the food product extends above the top of its container. Such systems are relatively inaccurate, and they give a simple "yes" or "no" answer, without indicating the extent of the overage, if any.

There is, therefore, a need for a new and improved system for measuring the height of food products in their containers during the packaging operation.

SUMMARY AND OBJECTS OF THE INVENTION

The present invention provides a photometric system in which a columnized beam of light is directed from a light source to a receiving station in such manner that one portion of the beam is interrupted by objects in the region in which their presence is to be detected. Another portion of the same beam passes to the receiving station without interruption by the objects. At the receiving station, the two portions of the beam are separated and monitored by photo-sensitive devices. The outputs of the photo-sensitive devices are compared to determine the extent to which objects are present in the region.

When the beam is directed a predetermined distance above a conveyor belt, the system is particularly suitable for measuring the height of objects, such as food products, on the belt.

It is in general an object of the present invention to provide a new and improved photometric system.

Another object of the invention is to provide a photometric system of the above character which is suitable for detecting the presence of an object and the extent to which the object is present in a predetermined region.

Another object of the invention is to provide a photometric system of the above character which can be utilized with a conveyor belt to measure the height of objects on the conveyor belt.

Additional objects and features of the invention will be apparent from the following description in which the preferred embodiment is set forth in detail in conjunction with the accompanying drawing.

DESCRIPTION OF THE PREFERRED EMBODIMENT

Figure 1:
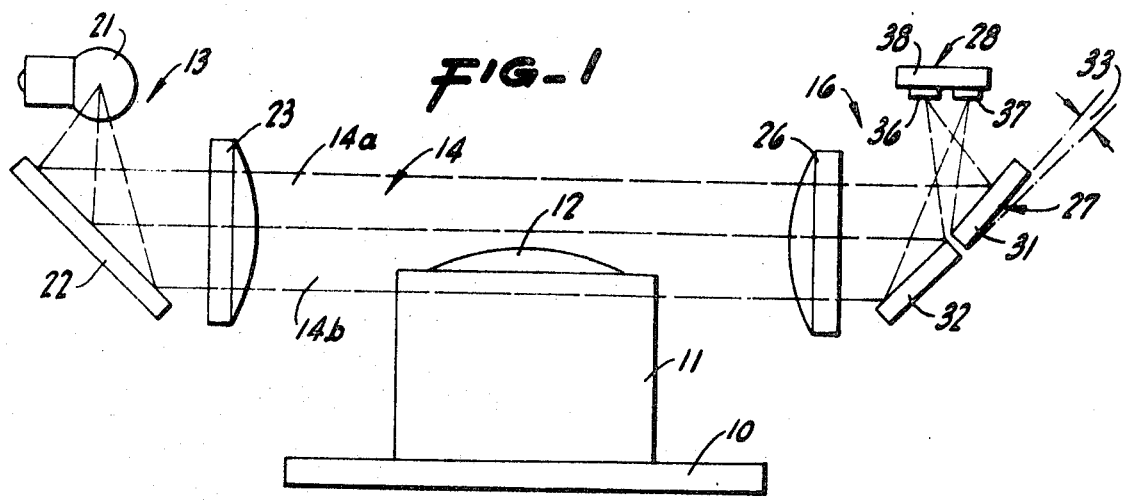
FIG. 1 is a schematic illustration of one embodiment of a photometric detector and measuring system incorporating the present invention, illustrating the use of the system to measure the height of an object on a conveyor belt.

In FIG. 1, the photometric system is illustrated in connection with a conveyor belt 10 carrying a container 11 which is filled with a product 12, such as potato chips, extending above the top of the container. The photometric system includes a light source 13 which directs a columnized beam of light 14 toward a receiving station 16. The beam of light is directed along a path which is generally parallel to the top surface of the conveyor belt. This beam is spaced above the belt by a distance such that the upper portion 14a of the beam passes uninterrupted to the receiving station at all times, while the lower portion 14b is at least partially interrupted by the container and product. The extent to which the lower portion is interrupted is determined by the height of the container and the product. With containers of uniform height, the extent of the interruption is determined by the extent to which the product extends above the top of the container.

The light source 13 includes an incandescent lamp 21, a mirror 22, and a lens 23. In the preferred embodiment, the mirror is a front surface mirror which serves to direct the light from the lamp 21 through the lens 23 to form a single column of light.

The receiving station 16 includes a lens 26, a mirror assembly 27, and a light detector 28. The lens 26 is disposed in the path of the beam of light 14, and it directs the beam to the mirror assembly 27. The mirror assembly comprises a pair of front surface mirrors 31 and 32 which are inclined at an angle 33 on the order of 1.5° with respect to each other. The light detector 28 comprises a pair of photosensors 36 and 37 which are mounted on a substrate 38. These photosensors produce output currents having magnitudes corresponding to the intensity of light impinging on them. They are mounted in such positions that the uninterrupted upper portion of the beam of light 14 is focused on the sensor 36 by the mirror 31, and the lower portion 14b is focused on the sensor 37 by the mirror 32. Thus, the output of the photosensor 36 is a current having a magnitude corresponding to the intensity of the uninterrupted portion of the beam, and the output of the photosensor 37 is a current having a magnitude corresponding to the intensity of the light from the lower portion of the beam.

In the preferred embodiment, the photosensors 36 and 37 are formed simultaneously by depositing a photo-sensitive material on the substrate 38, with a mask dividing the surface of the substrate into separate areas. This mask has a width on the order of 0.005 inch, and it is removed when the depositing operation is completed, leaving the photosensors 36 and 37. Having been formed in a common depositing operation on a common substrate, these photosensors are closely matched, have substantially identical temperature characteristics, and provide very linear operation.

Figure 2:
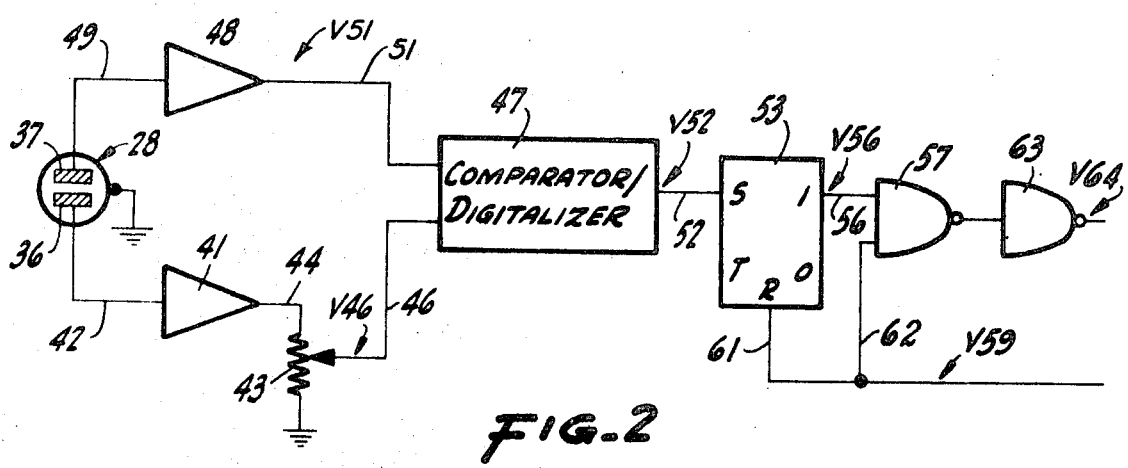
FIG. 2 is a block diagram of one embodiment of a control system which can be utilized with the photometric system of FIG. 1 to control the operation of the conveyor belt.
Figure 3:
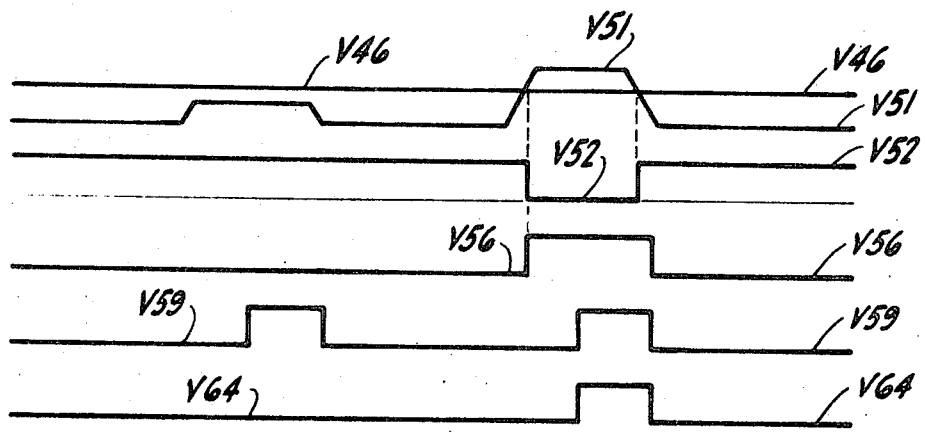
FIG. 3 is a graphical representation of the wave forms at certain points in the control system of FIG. 2.

As illustrated in FIG. 2, the output of the photosensor 36 is applied to the input of an amplifier 41 through a circuit 42. The output of the amplifier 41 is applied to a voltage divider 43 through a circuit 44. In the preferred embodiment, the voltage divider is a variable resistor or potentiometer, and the output of the voltage divider is a reference voltage V46 having a magnitude corresponding to the intensity of the light in the upper portion of the beam 14. The potentiometer permits the level of the reference voltage to be adjusted as desired. This voltage is applied to one input of a comparator/digitalizer 47 through a circuit 46.

The output of the photocell 37 is applied to the input of an amplifier 48 through a circuit 49. The output of this amplifier is a voltage V51 having a magnitude corresponding to the intensity of the light reaching the photosensor 37 from the lower portion of the beam. This voltage is applied to another input of the comparator/digitalizer 47 through a circuit 51.

The comparator/digitalizer stage 47 provided means for comparing the level of the signal voltage V51 with the level of the reference voltage V46. In the preferred embodiment, this stage comprises a differential amplifier connected in such manner that its output is high when the signal voltage is less than the reference voltage and zero when the signal voltage is greater than the reference voltage. Thus, the comparator/digitalizer stage provides means for comparing the analog voltages V51 and V46 and producing a digital output signal having a value corresponding to the relative magnitudes of these voltages. This digital output signal is designated by the reference numeral V52.

The digital signal V52 changes from a high value to a low value when the intensity of the light form the lower portion of the beam drops below the reference level established by the uninterrupted portion of the same beam. This signal can be utilized as a control signal to initiate any desired operation when the intensity drops below the reference level. For example, the system can be used to check the height of products in containers on a conveyor belt and initiate the diversion of containers containing excessively high products to a rejection track or lane. The rejection track may be located remotely of the station at which the height of the product is checked, and it may be desirable to store the control signal until the excessively high product reaches the point in the travel of the conveyor belt at which it is to be diverted to the rejection track.

Hence, the control signal V52 is applied to the input of a flip-flop 53 through a circuit 52. In the preferred embodiment, the flip-flop 53 is an R-S flip-flop, and the control signal V52 is applied to the set input. The output of the flip-flop, designated by a reference numeral V56 is applied to one input of a NAND gate 57 through a circuit 56. A timing signal V59 is applied to the reset input of the flip-flop through a circuit 61 and to a second input terminal of the NAND gate 57 through a circuit 62. This signal is conveniently obtained by means of a photo-cell located at a point in the travel of the conveyor belt near the rejection track. The output of the NAND gate 57 is connected to the input of NAND gate 63 which functions as an invertor. If desired, the NAND gates 57 and 63 can be replaced by a single AND gate. The output of the NAND gate 63 is a reject signal V64 which can be applied to the control mechanism of the conveyor belt to divert the rejected container to the rejecting track.

The light source 13 and receiving station 16 can be mounted on opposite sides of the conveyor belt by a suitable supporting structure attached to the framework of the conveyor belt. Solid state components, such as integrated circuits, can be utilized throughout the control system shown in FIG. 2. These components are readily mounted in a small package near the photosensors in the receiving station, or they can be located remotely of the receiving station if desired.

Operation and use of the system shown in FIGS. 1 and 2 can now be described briefly. Let it be assumed that the voltage divider 43 has been adjusted so that the signal voltage V51 is equal to the references voltage V46 when the height of the product 12 is less than or equal to the height of the container 11. Thus, as long as the products being measured are no higher than their containers, the digital output V52 of the comparator/analyzer is high, and the flip-flop 53 remains in its reset condition, with its output V56 low. In this situation, the NAND gate 57 is disabled, and the reject signal V64 is low.

When the product in one of the containers extends above the top of the container, the intensity of light reaching the photosensor 37 drops below the reference level, and the control signal V52 goes low. This transition sets the flip-flop 53, enabling the NAND gate 57. In this situation, the positive-going timing signal V59 is passed by the NAND gates 57 and 63 to provide a reject signal 64 which causes the container with the excessively high product to be diverted to the reject track. The negative-going trailing edge of the timing signal resets the flop and terminates the reject signal.

While the photometric system of the present invention has been described with specific reference to its use for detecting excessively high objects on a conveyor belt, it can be used in other applications. For example, the signal voltage V51 is an analog voltage having a magnitude corresponding to the extent to which an object penetrates the lower portion of the beam 14 and interrupts its passage to the receiving station 16. Thus, this signal can be applied to suitable indicators to provide a direct indication of the extent to which an object penetrates the path of the light beam. Height measurements are but one example of the form which this indication might take.

The photometric system of the present invention has been found to provide very stable operation and highly accurate results. The transmission of the reference and data information in a single columnized beam of light which passes through a single optical system provides substantially stability and accuracy than is possible in systems where data and reference beams are separated and transmitted through different media. Also, the manner in which the two photosensors are fabricated by a common deposit on a common substrate enhances the stability and accuracy of the system. Utilizing the techniques of the present invention, objects having heights on the order of 9 inches have been measured with an accuracy on the order of 0.005 inch.

It is apparent from the foregoing that a new and improved photometric detector and measuring system has been provided. While only the presently preferred embodiment has been described, as will be apparent to those familiar with the art, certain changes and modifications can be made without departing from the scope of the invention as defined by the following claims.

I claim:

1. In a photometric system for determining the height of an object above a surface, light source means for directing a single and continuous beam of light in a path generally parallel to the surface, light detecting means disposed in the path of the beam, said beam having a first portion passing directly and continuously to the light detecting means and a second portion which is at least partially obstructed by the upper portion of the object, said light detecting means including first photosensor means for receiving light from the first portion of the beam and providing a reference electrical signal corresponding to the intensity of said first portion and second photosensor means for receiving light from the second portion of the beam and providing a height electrical signal corresponding to the intensity of said second portion, means for comparing the reference and height signals and providing a control signal when the height signal is at a predetermined level relative to the reference signal, bistable logic means connected for receiving the control signal assuming predetermined output state in response thereto and logic gate means receiving inputs from the bistable logic means and from an external timing signal source, said gate means providing an output signal if the cistable logic means is in its predetermined state when a timing signal is received.

* * * * *